United States Patent
Connolly et al.

(10) Patent No.: US 8,396,106 B2
(45) Date of Patent: *Mar. 12, 2013

(54) SYSTEM AND METHOD FOR IMPROVING EQUALIZATION IN A HIGH SPEED SERDES ENVIRONMENT

(75) Inventors: Brian J. Connolly, Williston, VT (US); Todd E. Leonard, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 1362 days.

This patent is subject to a terminal disclaimer.

(21) Appl. No.: 12/101,230

(22) Filed: Apr. 11, 2008

(65) Prior Publication Data

US 2009/0257514 A1 Oct. 15, 2009

(51) Int. Cl.
*H03H 7/30* (2006.01)
(52) U.S. Cl. ........ 375/232; 370/235; 375/229; 375/257; 381/103
(58) Field of Classification Search .................. None
See application file for complete search history.

(56) References Cited

U.S. PATENT DOCUMENTS

| | | |
|---|---|---|
| 6,621,862 B1 | 9/2003 | Dabell |
| 7,184,475 B2 * | 2/2007 | Dohmen et al. ............ 375/232 |
| 7,295,618 B2 | 11/2007 | Hsu et al. |
| 7,463,628 B2 * | 12/2008 | Parker et al. ............ 370/392 |
| 2003/0179771 A1 * | 9/2003 | Chan et al. ............ 370/445 |
| 2003/0193894 A1 * | 10/2003 | Tucker et al. ............ 370/235 |
| 2004/0071219 A1 | 4/2004 | Vorenkamp et al. |
| 2004/0258166 A1 * | 12/2004 | Camara et al. ............ 375/257 |
| 2004/0264605 A1 | 12/2004 | Kyosti et al. |
| 2005/0125175 A1 | 6/2005 | Murugan et al. |
| 2006/0090195 A1 * | 4/2006 | Pearson et al. ............ 726/3 |
| 2006/0184864 A1 | 8/2006 | Lesartre |
| 2007/0201437 A1 * | 8/2007 | Kim et al. ............ 370/352 |

OTHER PUBLICATIONS

"Pre-emphasis and its impact on the Eye Pattern and Bit Error Rate for High Speed Signalling," David Norte, The EMC, Signal and Power Integrity Institute, 2005, 15 pages.
U.S. Appl. No. 12/056,386; Final Office Action; Date Filed: Mar. 27, 2008; Date Mailed: Feb. 3, 2011.

* cited by examiner

*Primary Examiner* — David C. Payne
*Assistant Examiner* — Adolf Dsouza
(74) *Attorney, Agent, or Firm* — Cantor Colburn LLP; Michael LeStrange

(57) ABSTRACT

A method and accompanying system are disclosed for tuning each channel of a high-speed SerDes link interface arranged in a configuration linking a local side to a remote side. The method includes transmitting a flow control packets from the local side to the remote side to change remote side transmission characteristics in a link channel; monitoring the bit error rate (BER) in the link channel; transferring additional flow control packets to adjust the remote side transmission characteristics; and processing the BER data at the local side to generate the remote side transmission characteristics for the link channel.

8 Claims, 3 Drawing Sheets

SYSTEM AND METHOD FOR IMPROVING EQUALIZATION IN A HIGH SPEED SERDES ENVIRONMENT

BACKGROUND OF THE INVENTION

The present invention relates generally to high-speed data communication links and, more particularly, to improving equalization in a high-speed serializer-deserializer (SerDes).

System architectures such as Infiniband™ and PCI Express utilize high-speed serializer-deserializer (SerDes) links to transmit data packets across serial links. These architectures are migrating to SerDes links that support link speeds at single data rate (SDR), double data rate (DDR) and quad data rate (QDR). In doing so, each architecture is defining link-training methods that enable the link to support transmitting data at the higher data rates.

The Infiniband specification, Vol. 2, Rel. 1.2, supports adaptive equalization to compensate for signal distortion at the higher data rates. The Infiniband specification, section 5.6.4, Link Training State Machine, defines the procedure to enable adaptive equalization in an Infiniband system. The Link Training State Machine specification defines a 2 ms period to negotiate each side of a link's capabilities to support the SDR, DDR and QDR speeds. Once the negotiation process is completed, the Infiniband specification defines a 100 ms period to allow the default, or any of the 16 other possible (possibly available) adaptive equalization settings to be implemented across the entire link width, i.e., all of the link channels.

This solution is limited, however, in that one setting is selected for the entire link width (i.e., all of the channels). Link widths can be 1, 4, 8 and 12 channels wide using Infiniband, and up to 16 channels wide for PCI express. In an ideal system, every channel would be uniform and the above-mentioned method would be fine. In reality, however, this is hardly the case. That is, each medium or channel has it own set of impedance characteristics and tolerance. The Link Training State Machine method does not take into the account the varying characteristics between each channel. By limiting each channel to one set of adaptive equalization settings could mean that some of the channels will not work optimally at DDR/QDR rates. For example, at DDR/QDR speeds, real-time operation may find that only 8 channels out of the 12 available channels are operating effectively, which would result in significant performance degradation.

What would be desirable, therefore, is a new structure and process that allows for each channel within a high-speed SerDes architecture to be independently monitored and the channel's adaptive equalization setting modified where necessary.

SUMMARY OF THE INVENTION

To that end, the present invention provides a system structure and method that allows that each channel within a SerDes link (such as, for examples, Infiniband or PCI Express architecture or hardwired communication links) operating at DDR/QDR speeds to monitored independently for BER and, where necessary, modify the channel's adaptive equalization setting. This novel operation includes monitoring the bit error rate (BER) for each channel at the receive side of the link. The receive side, based on the BER, sends packets to the transmit side containing new transmit coefficients on a channel-by-channel basis to be applied. In some embodiments, this may allow the receive side to control each channels adaptive equalization, all the time.

One embodiment of the present invention is directed to a method for tuning each channel of a high-speed SerDes link interface arranged in a configuration linking a local side to a remote side. The method of this embodiment includes transmitting a flow control packets from the local side to the remote side to change remote side transmission characteristics in a link channel; monitoring the bit error rate (BER) in the link channel; transferring additional flow control packets to adjust the remote side transmission characteristics; and processing the BER data at the local side to generate the remote side transmission characteristics for the link channel.

Another embodiment of the present invention is directed to a program storage device readable by machine, tangibly embodying a program of instructions executable by the machine to perform method steps for tuning each channel of a high-speed SerDes link interface arranged in a configuration linking a local side to a remote side. The method includes transmitting a flow control packets from the local side to the remote side to change remote side transmission characteristics in a link channel; monitoring the bit error rate (BER) in the link channel; transferring additional flow control packets to adjust the remote side transmission characteristics; and processing the BER data at the local side to generate the remote side transmission characteristics for the link channel.

Another embodiment of the present invention is directed to a system for tuning each channel of a high-speed SerDes link interface arranged in a configuration linking a local side to a remote side. The system of this embodiment includes a local side physical layer that includes a local side transmitter; a local side receiver electrically connected to the local side transmitter; a local side serializer electrically connected to an output of the local side transmitter; a local side deserializer electrically connected to an input of the local side receiver; and a local side adaptive pre-emphasis logic block. The adaptive pre-emphasis logic block is coupled between the local side transmitter and the local side receiver and configured to receive an indication of a bit error rate for a channel of the high-speed SerDes cable link and to create based thereon coefficients to be applied to a remote side serializer.

DESCRIPTION OF THE DRAWING FIGURES

DETAILED DESCRIPTION OF THE INVENTION

Figure 1:
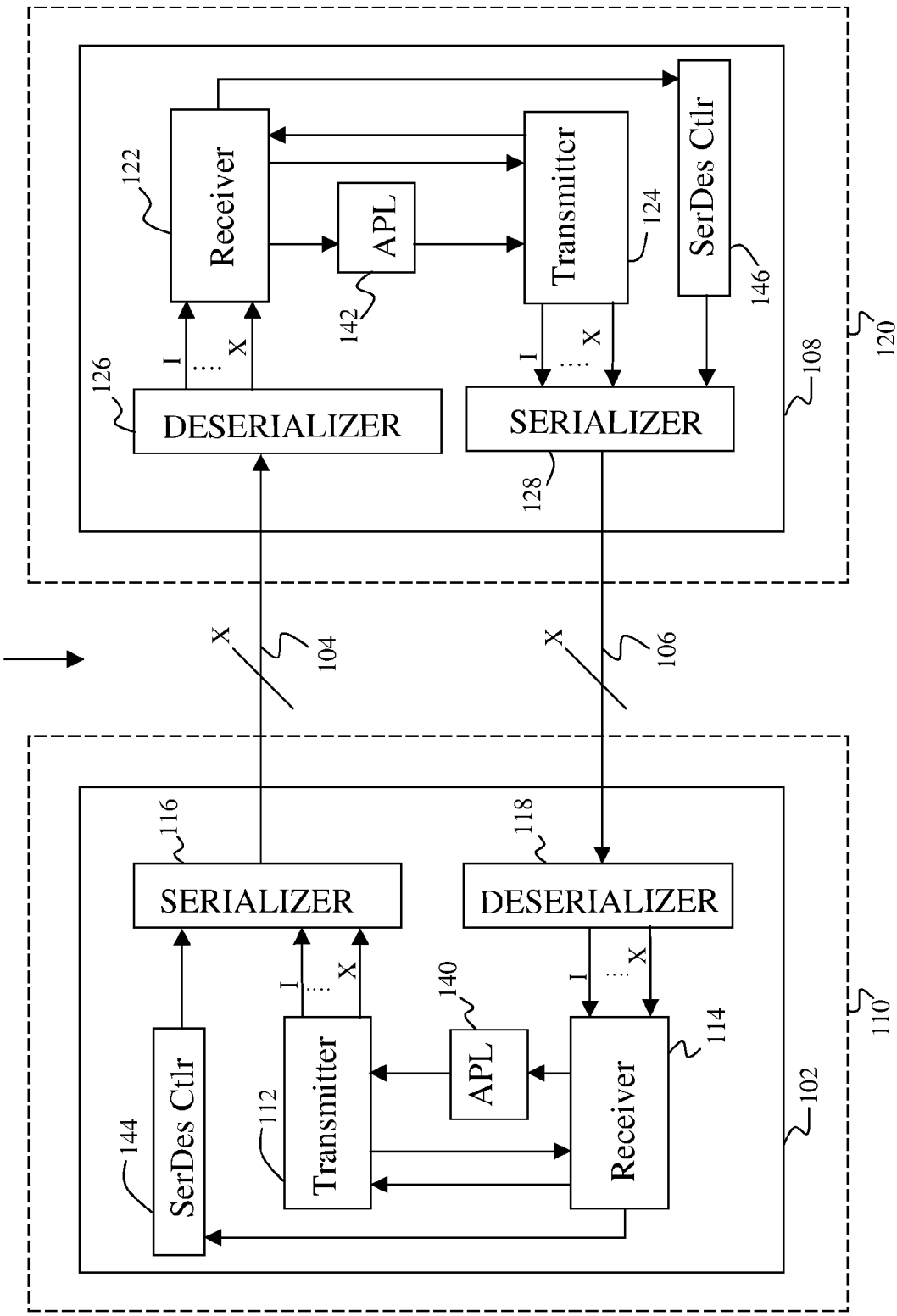
FIG. 1 is a system level diagram of an Infiniband link configuration according to an embodiment of the present invention.

FIG. 1 is a system level diagram of an Infiniband Link configuration 100 within which an Infiniband embodiment of the invention is implemented. The reader and skilled artisan alike should realize that the FIG. 1 configuration is provided for exemplary purposes only, to explain the inventive principles, and that the invention may be implemented in any high-speed SerDes-based link architecture available, for example, PCI Express, without limitation. That is, the invention may be implemented by modifying the said SerDes link architectures to use undefined OP codes in the flow control packets to pass new transmit coefficients for each lane/channel. Furthermore, the link, as used herein, may also refer to hardwired communications links.

At the receiving side, a novel function processes the channel link BER data and determine new transmit coefficients to be applied to the serializer on the transmit side. These coefficients are sent via packets to the transmit side. The receive side then continues to monitor the channel and if the BER increases, new coefficients are calculated. If the BER decreases, the coefficient may be further adjusted in the direction of the previous adjustment until the BER stops decreasing.

FIG. 1 shows both the transmitter (TX) or local side 110 of link 100, and the receiver (RX) or remote side 120 of the link 100. It should be noted that the convention used for the transmitter and receiver sides as shown is for exemplary purposes only, so that in any implementation, the local and remote link physical layers may be reversed.

The transmitter (TX) side 110 is electrically connected to the TX device link layer, designated 102. The TX device link layer 102 connects to the TX side transmitter 112, TX side receiver 114, and TX side serializer 116. TX side receiver 114 receives data from TX side deserializer 118, and provides the received data to the device link layer 102. The TX side serializer 116 further connects to RX side deserializer 126 via Infiniband cable 104. An RX side serializer 128 connects to TX side deserializer 118 via Infiniband cable 106, and connects to RX side device link layer 108. The RX side deserializer 126 connects to RX side receiver 122, and the RX side serializer 128 connects to the RX side transmitter 124 (and the device link layer 108).

Both the local side 110 and the remote side 120 also include Adaptive Pre-Emphasis Logic (APL) blocks 140 and 142, respectively. The local side 110 APL block 140 is connected between the TX side receiver 114 and the TX side transmitter 112. The remote side 112 APL block 142 is connected between the RX side receiver 122 and the RX side transmitter 124. In addition, both the local side 110 and the remote side 120 include SerDes controllers 144 and 146, respectively. The local side 110 Serdes controller 144 is connected between the TX side receiver 114 and the TX side serializer 116. The remote side 112 Serdes controller 146 is connected between the RX side receiver 122 and the RX side serializer 128.

In general, the APL blocks 140 and 142 are configured to determine a new set of transmit coefficients that should be relayed across the link 100 to adjust the serializer on the other side of the link based on BER characteristics of the received signal. The APL 140 is used to change the equalization setting in the remote serializer 128. The APL 140 receives, through the receiver 114, Bit Error Rate (BER) information. An APL state machine monitors the BER for each channel and utilizes an Adaptive Pre-emphasis Look Up table (APL LUT). The Serdes controllers 144 and 146 receive, via the receiver to which it is connected, the new transmit coefficients that will be applied to the serializer to which it is connected.

Operation of the novel high-speed SerDes architecture operation is as follows and allows for each channel in an Infiniband system (including any other system that contains a Serdes that supports multiple data rates) to independently control each channel's adaptive equalization setting. For ease of explanation, only the local side 110 is discussed but the discussion is equally applicable to the remote side 120.

The TX side 110 of the link 100 monitors the quality of each channel independently through the Bit Error Rate (BER) or other mechanism and sends packets to the across the link 100 that contain a new set of coefficients pertaining to the channel. This allows the local side 110 of the link 100 to control each channel adaptive equalization capabilities all the time. That is, in the general context, the local side 110 controls the transmission coefficients of the remote side 120 and vice-versa.

The normal Infiniband method only looks at a 4 ms window to determine the best setting. The information needs to be exchanged may be sent in an Infiniband system with Flow Control packets and/or Vendor specific packets. These two types of packets can be utilized to send specific adaptive equalization setting for each channel, thereby enhancing the overall link performance.

The specific Vendor specific and Flow control packets are defined by the Infiniband standard as follows:
7.9.4.1 Flow Control Packet Fields
 7.9.4.1.1 Operand (Op)—4 Bits
 The flow control packet is a link packet with one of two Op (operand) values: an operand of 0x0 indicates a normal flow control packet; an operand value of 0x1 indicates a flow control initialization (init) packet.
 C7-55: When in the PortState LinkInitialize, flow control packets shall be sent with the flow control init operand, 0x1.
 C7-56: When in the PortStates LinkArm or LinkActive, flow control packets shall be sent with the normal flow control operand, 0x0.
 C7-57: All other values of the Op field are reserved for operations that may be defined by Infiniband architecture (IBA) in the future. Any packet received with a reserved value shall be discarded.
5.3.1.9 Vendor Specific Control Symbol
 The IB standard reserves a special control symbol (K28.6) for vendor specific use. The function and use of this symbol is vendor-defined and interoperability between vendors is not guaranteed. The vendor negotiation process for the use of this symbol is not defined by this specification.

Any Op code values other then 0 or 1 may be used. If the RX side device 108 that the transmit link 110 is attached to (through receiver link 120) does not support the function, then the packet would simply be discarded. Since the requesting or transmit link 110 would therefore not receive an acknowledge packet from the device link layer 108 (communicating through RX link 120), the transmit link 110 will realize that the RX side device cannot or does not support the function.

Figure 2:
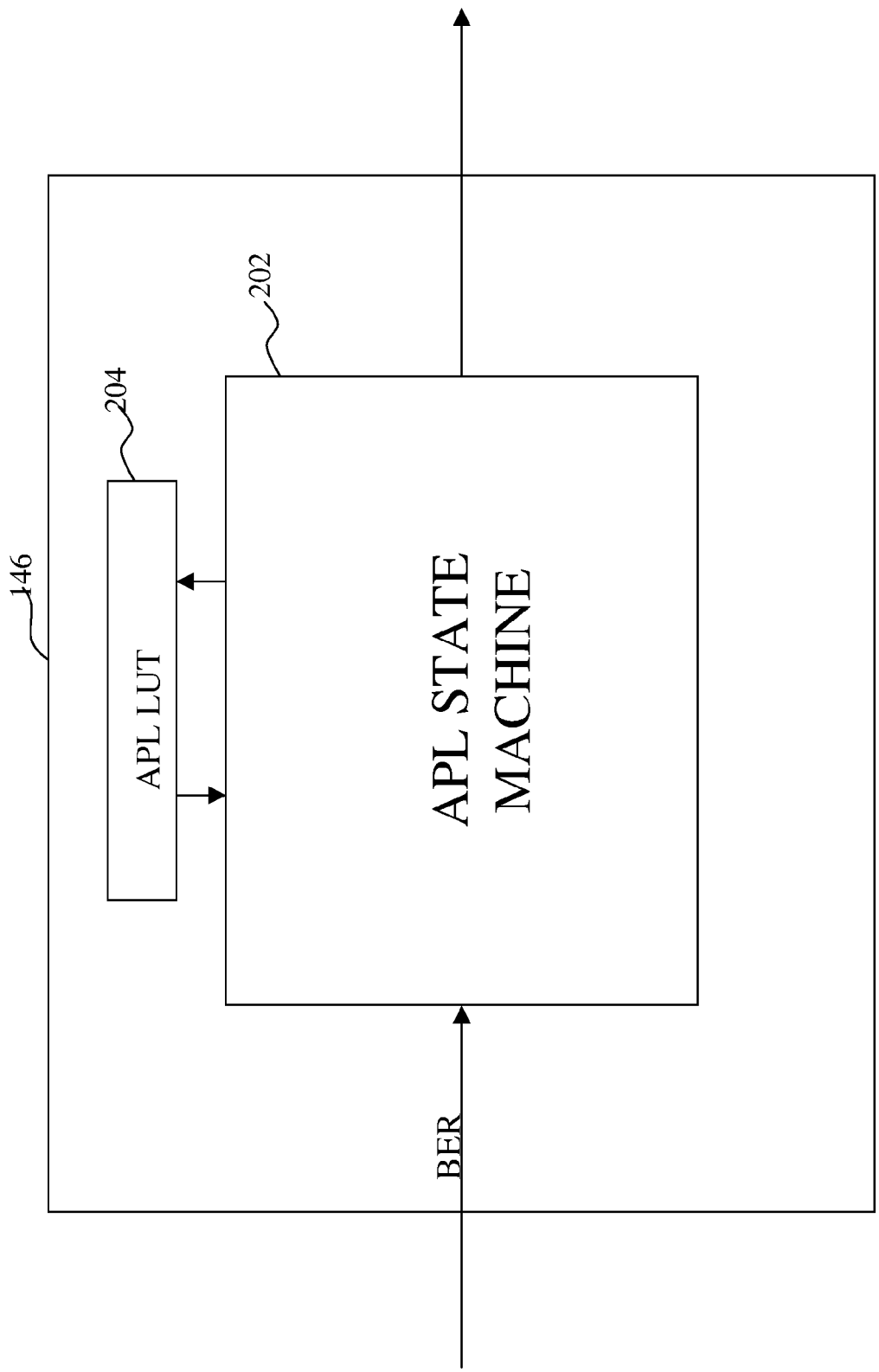
FIG. 2 is a more detailed diagram of a portion of the link configuration shown in FIG. 1.

FIG. 2 shows a more detailed block diagram of the APL 140. The APL 140 includes an APL state machine 202. The APL state machine 202 receives, from the logic in the receiver 114, the BER for each channel. The APL state machine 202 is connected to an APL lookup table 204 which provides of set of Adaptive Pre-emphasis values that may be used as coefficients for the transmitter 128 on the remote side.

In operation, the APL state machine 202 strobes the local side transmitter 112 to send a special Flow Control Packet or Vendor Packet with the new set of equalization values. The remote side receiver, 122 decodes the packet and signals to the SerDes Controller 146 to load the new equalization settings in to the remote side serializer 128. In some embodiments, the local side 110 continues to monitor the channel to see if the changes it made have improved the quality of the link or not.

In greater detail, the APL state machine 202 receives, for example, the BER for a first channel. The APL state machine 202 accesses the APL lookup table 204 and receives a first set of coefficients. These coefficients are transmitted to the remote side and the remote serializer updated based upon them. The APL state machine 202, at a later time, may receiver another BER for the first channel. If the BER improved since the last transmittal of coefficients to the remote side 120, the APL state machine 202 may determine that the coefficients have been adjust in the correct direction (i.e., increased or decreased in value) and may, by utilizing the APL lookup table 202, transmit new increased or decreased coefficients as the case may be. This may continue until the BER begins to become worse.

In the event that after the first set of coefficients are transmitted the BER did not improve of became worse, the APL state machine 202 may determine that coefficients increasing or decreasing in the opposite direction should be selected from the APL lookup table 204.

Figure 3:
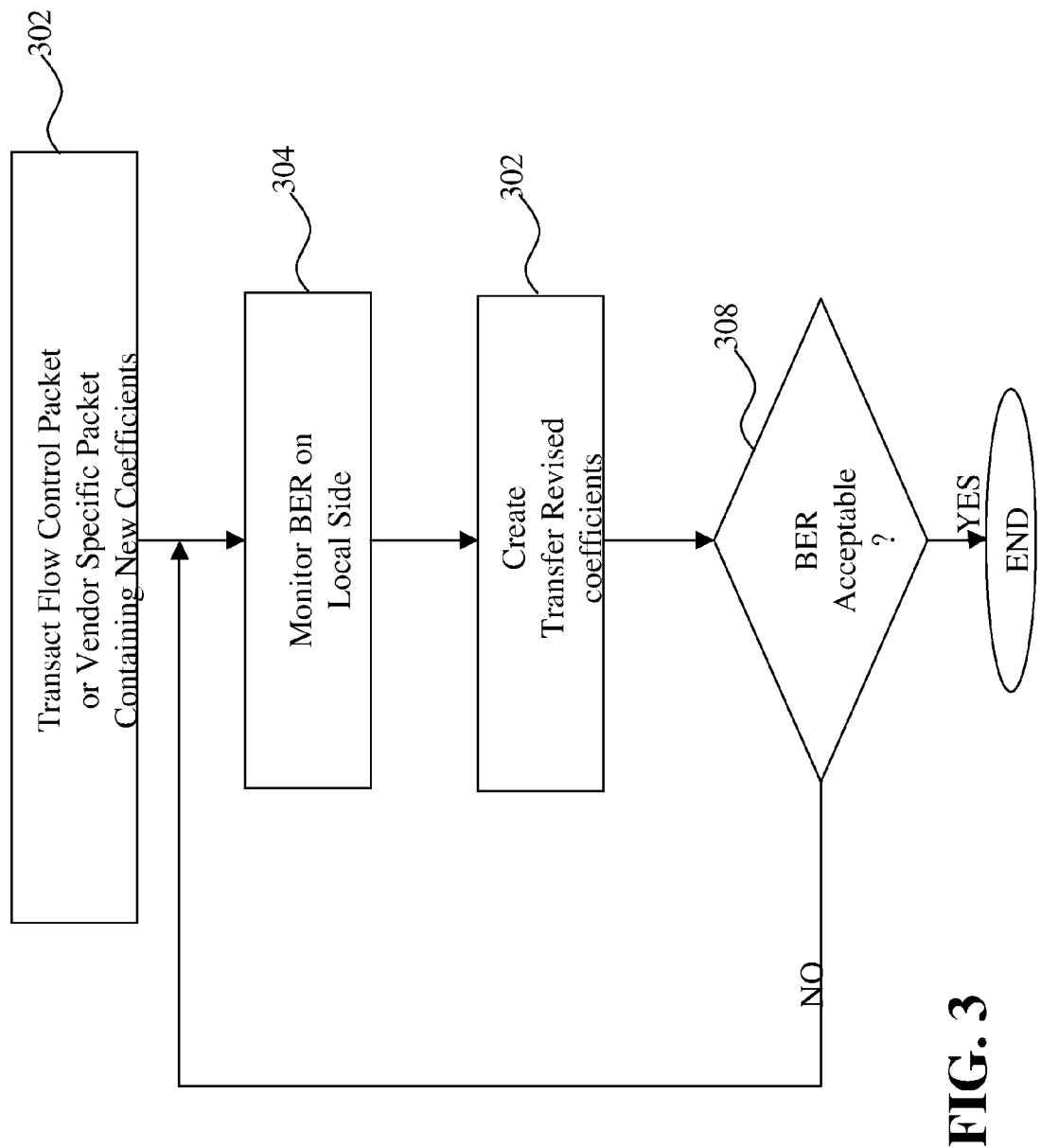
FIG. 3 is a schematic block diagram that depicts an inventive method for implementing improved high-speed SerDes operation of the invention.

FIG. 3 sets forth a method 300 for tuning each channel of a high-speed SerDes cable link interface arranged in a configuration linking a local side physical layer to a remote side physical layer. Method 300 includes transmitting either a flow control or vendor specific packet having new transmitter coefficients from the local side to the remote side as represented by block 302. The BER characteristics are monitored further at the local side in block 304. As discussed above, if the BER still needs fine tuning or major adjustments, new coefficients may be created and transferred to the remote as represented by step 306. If, as determined at block 308, the BER is acceptable for a particular channel, the method 308 may end; else, the method returns to block 304. Of course, the method may be restarted at any time or may continually run.

The flow control signal defines the channels to be monitored by the remote side, and the number of cycles the BER is carried out. The flow control signal is preferably included in an enable packet which enables operation of the remote side. After receiving the setup packet, the remote side responds by forwarding back an acknowledge packet that provides acknowledgement that it is ready to have its transmit coefficients changed. The local side may then transmit an adaptive packet that includes the new transmit coefficients and the particular channel/lane they should be applied to. The new coefficients may be in the form of a lookup table or particular values that may be applied to particular registers or pins that control the remote side serializer. Each packet is preferably generated using a separate op code.

Although a few examples of the present invention have been shown and described, it would be appreciated by those skilled in the art that changes may be made in these embodiments without departing from the principles and spirit of the invention, the scope of which is defined in the claims and their equivalents.

The invention claimed is:

1. A method for tuning each channel of a physical multi-channel high-speed SerDes link interface arranged in a configuration physically linking a local side to a remote side, the method comprising:
    separately transmitting a flow control packet from the local side to the remote side to change remote side transmission characteristics in each link channel of the physical multi-channel high-speed SerDes link interface;
    monitoring the bit error rate (BER) in each link channel at the local side;
    transferring additional flow control packets from the local side to the remote side on each link channels to adjust the remote side transmission characteristics for each link channel independent of each other; and
    processing the BER data at the local side to generate the remote side transmission characteristics for each link channel.

2. The method for tuning as set forth in claim 1, wherein processing includes retrieving transmission coefficients from a look-up table.

3. The method for tuning as set forth in claim 1, further comprising monitoring eye characteristic data in the channels used for data transfer, transferring eye characteristic data to the local side physical layer and processing the eye characteristic data to further support equalization setting adjustments.

4. The method for tuning as set forth in claim 1, wherein the step of transmitting includes generating an enable packet that enables operation of the remote side.

5. The method for tuning as set forth in claim 4, wherein the step of transmitting further includes generating an acknowledge packet within which the remote side provides acknowledgement to the local side that it will accept changes to its transmission coefficients.

6. The method as set forth in claim 1, wherein each packet is generated using a separate op code.

7. The method as set forth in claim 1, wherein an op code value may be used that is other than 0 or 1.

8. A program storage device readable by a computer, tangibly embodying a program of instructions executable by the computer to perform a method for tuning each channel of a multi-channel high-speed SerDes link interface arranged in a configuration linking a local side to a remote side, the method comprising:
    separately transmitting a flow control packet from the local side to the remote side to change remote side transmission characteristics in a each link channel of the physical multi-channel high-speed SerDes link interface;
    monitoring the bit error rate (BER) in each link channel at the local side;
    transferring additional flow control packets from the local side to the remote side on each link channels to adjust the remote side transmission characteristics for each link channel independent of each other; and
    processing the BER data at the local side to generate the remote side transmission characteristics for each link channel.

* * * * *